Dec. 30, 1941.    T. SARTI    2,268,306

VIBRATION DAMPENING DEVICE

Filed Dec. 8, 1939

Inventor
TINO SARTI

By Young, Emery & Thompson
Attorneys

Patented Dec. 30, 1941

2,268,306

UNITED STATES PATENT OFFICE 2,268,306

VIBRATION DAMPENING DEVICE

Tino Sarti, Milan, Italy

Application December 8, 1939, Serial No. 308,258
In Italy January 10, 1939

2 Claims. (Cl. 248—358)

The invention relates to a device for insulating different members from each other and dampening the vibrations transmitted by different organs of delicate instruments or apparatus, so as to prevent transmission of said vibrations to the various structures. Many devices of this character are known, which, however, comprise a plurality of elements and consist of several members, some of which work under compression and some under tension and are kept assembled by elastic diaphragms. The assembly of such devices is difficult, their construction is complicated and expensive, owing to a considerable waste of material specially for the fastening parts, and said devices must be tested one by one in order to attain the certainty of a perfect assembly, which is not easily obtained.

According to the present invention, these drawbacks are eliminated, as the dampening device is characterised by a single block of rubber or other elastic material which constitutes between the two members to be connected a small cylinder capable of acting against compression and so shaped at its edges so as to hold said members, which are then clamped by a simple screw and nut device.

The device will now be more fully described with reference to the attached drawing wherein.

Figure 1:
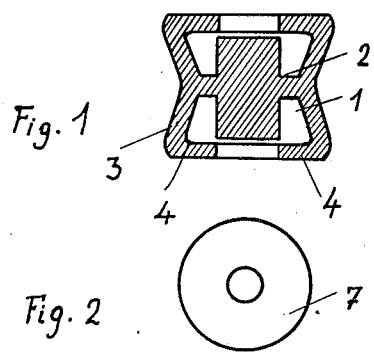
Fig. 1 is a sectional view of the rubber block.
Figure 2:
Figs. 2 and 3 represent the clamping washer and screw.
Figure 3:
Figure 4:
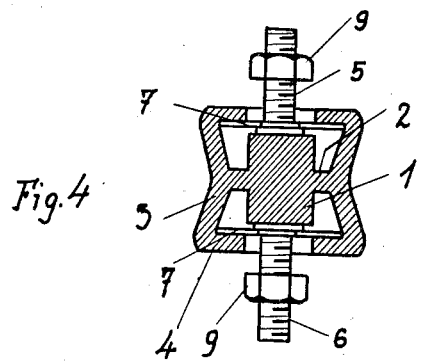
Fig. 4 represents the rubber block mounted on the organs to be connected.

According to the example represented, the rubber block consists of the inner cylinder 1 provided with a central rib 2 thereon, forming a disc and bearing the outer band 3 bent at the edges 4. The band 3 has an aperture at the top. The central cylinder 1 is placed between the two members 5 and 6 to be connected and acts as a dampener against hits, reacting against compression, while the band 3 reacts against tension.

The device is assembled in the following manner: the members to be fixed are connected by a screw 5, 6 having a flat head 8. On said head is placed the washer 7 which is inserted into the ribbed edge 4 of the band 3 of the block, so that the flat head of the screw rests on the central cylinder 1. The nut 9 is then screwed thereon for clamping.

As appears from the drawing, the assembly is very simple and absolutely safe and centered, as the inner rubber cylinder has no possibility of displacing or bending or assuming a tranversal position as is liable to happen in the old types of devices wherein the body reacting against compression is independent. The elastic pressure on the ribbed rubber edge makes it possible to do without other complex clamping devices, such as grooved washers, pierced nuts or cotter pins. The heads of the screws are flat and not grooved so that they do not wear the rubber plug, but produce a sufficient friction between said heads and the end faces of the cylinder so as to allow locking of the nuts with a sure clamp like action.

The clamping device consisting of an usual screw and washer is simple and cheap as it avoids waste of material.

By such way, the central cylinder reacts against compression, the outer band against tension while the rib prevents relative misalignment. All hits and vibrations are thus absorbed by the rubber plug and are not transmitted between the two members connected. The device hereinabove described can be applied both vertically and horizontally and can of course be made in the most different sizes and for different apparatus; it serves specially, however, for protecting delicate and accurate instruments mounted on motor vehicles, ships, trains and aircrafts, and generally near operating motors.

What I claim is:

1. A dampening connecting device for the mechanical connection of elements, comprising a solid body of resilient material, a tubular body of said material surrounding the solid body in spaced relation thereto and extending beyond the ends thereof, a web extending about the solid body intermediate its ends and connecting the solid and tubular bodies, the ends of said tubular body having inturned peripheral flanges, metal washers positioned within the tubular body and lying against the peripheral flanges, and bolts having heads interposed between the ends of the solid body and said washers and projecting from each end of the device for connecting the latter to elements to be connected and binding the peripheral flanges between the washers and the elements to be connected.

2. A shock absorber connection for connecting mechanical members, comprising an elastic buffer element, rigid discs having bolts extending therefrom, one connected to each of said mechanical members, said discs bearing against opposite ends of said buffer element, a housing of elastic material surrounding the buffer element and the rigid discs and connected to the buffer member by a median web, the ends of the housing having axial openings for the passage of the bolts and retaining the washers, bolts and discs in axial alignment with the buffer element.

TINO SARTI.